(12) United States Patent
McMillen

(10) Patent No.: US 6,668,679 B2
(45) Date of Patent: Dec. 30, 2003

(54) APPARATUS AND METHOD FOR PULLEY ACTUATOR

(75) Inventor: Robert McMillen, Tecumseh (CA)

(73) Assignee: L & P Property Management Company, South Gate, CA (US)

( * ) Notice: Subject to any disclaimer, the term of this patent is extended or adjusted under 35 U.S.C. 154(b) by 26 days.

(21) Appl. No.: 10/008,351

(22) Filed: Dec. 7, 2001

(65) Prior Publication Data

US 2003/0106391 A1 Jun. 12, 2003

(51) Int. Cl.[7] .............. F16C 1/10; B66B 11/04
(52) U.S. Cl. ............ 74/500.5; 74/501.6; 74/505; 74/506; 297/410; 187/251
(58) Field of Search .......... 74/110, 470, 500.5–506; 187/251, 24, 214, 252, 267, 268; 297/408, 410

(56) References Cited

U.S. PATENT DOCUMENTS

| | | | |
|---|---|---|---|
| 638,918 A | * 12/1899 | Fraser ................ 187/251 |
| 823,971 A | 6/1906 | Remondy | |
| 2,672,057 A | * 3/1954 | Bratz ................ 74/110 |
| 3,631,951 A | 1/1972 | Quenneville ........ 192/8 C |
| 3,726,370 A | 4/1973 | Hubbard, Jr. ....... 192/8 C |
| 3,759,358 A | 9/1973 | Quenneville ........ 192/8 C |
| 3,796,292 A | 3/1974 | Harrison ........... 192/8 C |
| 3,876,184 A | 4/1975 | Eudy ............... 254/150 R |
| 4,014,422 A | 3/1977 | Morishita ......... 192/67 R |
| 4,316,631 A | 2/1982 | Lenz et al. ........ 297/284 |
| 4,354,709 A | 10/1982 | Schuster .......... 297/284 |
| 4,494,709 A | 1/1985 | Takada ............ 242/107.6 |
| 4,561,606 A | 12/1985 | Sakakibara et al. .... 242/107 |
| 4,614,257 A | 9/1986 | Harada et al. ...... 192/8 C |
| 4,778,138 A | 10/1988 | Yamada ............ 248/421 |
| 4,786,110 A | 11/1988 | Mahling et al. ..... 297/362 |
| 4,798,098 A | * 1/1989 | Keller et al. ...... 74/470 |
| 4,817,771 A | 4/1989 | Iten ............... 192/16 |
| 5,010,780 A | 4/1991 | Hatfield .......... 74/501.5 R |
| 5,050,930 A | 9/1991 | Schuster et al. ...... 257/284 |
| 5,080,200 A | * 1/1992 | Gibson ............. 187/24 |
| 5,080,434 A | 1/1992 | Locher ............. 297/301 |
| 5,186,412 A | 2/1993 | Park ............... 242/245 |
| 5,197,780 A | 3/1993 | Coughlin .......... 297/284.7 |
| 5,211,368 A | 5/1993 | Kitamura .......... 248/292.1 |
| 5,217,278 A | 6/1993 | Harrison et al. .... 297/284.7 |
| 5,248,017 A | 9/1993 | Schwarzbich ....... 192/8 R |
| 5,382,076 A | 1/1995 | Scheck et al. ..... 297/354.12 |
| 5,397,164 A | 3/1995 | Schuster et al. ..... 297/284.1 |
| 5,449,219 A | 9/1995 | Hay et al. ......... 297/284.4 |
| 5,522,488 A | 6/1996 | Schwarzbich ....... 192/8 R |

(List continued on next page.)

FOREIGN PATENT DOCUMENTS

| | | | | |
|---|---|---|---|---|
| DE | 1817854 | * | 2/1973 | .......... 74/506 |
| DE | 29 47 472 | | 8/1980 | .......... B60N/1/00 |
| DE | 19546813 A1 | * | 6/1997 | .......... 74/501.5 R |
| EP | 0 006 840 B1 | | 2/1982 | .......... A47C/23/00 |
| EP | 0 322 535 A1 | | 7/1989 | .......... A47C/7/46 |
| EP | 0 885 164 B1 | | 7/2002 | .......... B65H/75/30 |

OTHER PUBLICATIONS

Halliday Resnick, Physics Parts I & II, pp. 109–114, Publisher John Wiley & Sons, Inc., 1967.*

Primary Examiner—Vinh T. Luong
(74) Attorney, Agent, or Firm—Grant D. Kang, Esq.; Robert C. Haldiman, Esq.; Husch & Eppenberger, LLC

(57) ABSTRACT

A tensioning cable actuator has a housing with a nut held in the housing. The nut has threads which engage a lead screw that has corresponding threads. A pulley cradle is fixed to the lead screw. The pulley cradle is disposed within the housing to translate axially with the lead screw upon rotation of the nut. A pulley is disposed in the pulley cradle. A Bowden cable wire wraps around the pulley and is anchored to the housing so that the wire moves into or out of the Bowden cable sleeve twice far as the lead screw moves.

16 Claims, 11 Drawing Sheets

U.S. PATENT DOCUMENTS

| | | | |
|---|---|---|---|
| 5,567,010 A | 10/1996 | Sparks | 297/284.4 |
| 5,567,011 A | 10/1996 | Sessini | 297/284.7 |
| 5,593,210 A | 1/1997 | Schwarzbich | 297/361.1 |
| 5,609,394 A | 3/1997 | Ligon, Sr. et al. | 297/284.4 |
| 5,638,722 A | 6/1997 | Klingler | 74/502.4 |
| 5,681,005 A | 10/1997 | Ligon, Sr. et al. | 242/394.1 |
| 5,704,687 A | 1/1998 | Klingler | 297/284.4 |
| 5,769,491 A | 6/1998 | Schwarzbich | 297/284.4 |
| 5,794,479 A | 8/1998 | Schwarzbich | 74/143 |
| 5,842,659 A | 12/1998 | Ligon, Sr. et al. | 242/394.1 |
| 5,937,704 A * | 8/1999 | Shimizu et al. | 74/500.5 |
| 6,045,185 A | 4/2000 | Ligon, Sr. et al. | 297/284.4 |
| 6,050,641 A | 4/2000 | Benson | 297/284.4 |
| 6,158,300 A | 12/2000 | Klingler | 74/526 |
| 6,178,838 B1 | 1/2001 | Schwarzbich | 74/143 |
| 6,227,617 B1 | 5/2001 | von Möller | 297/284.4 |
| 6,230,867 B1 | 5/2001 | Schwarzbich | 192/223.2 |
| 6,238,123 B1 | 5/2001 | Schwarzbich | 403/45 |
| 6,345,549 B1 | 2/2002 | Lance | 74/500.5 |

* cited by examiner

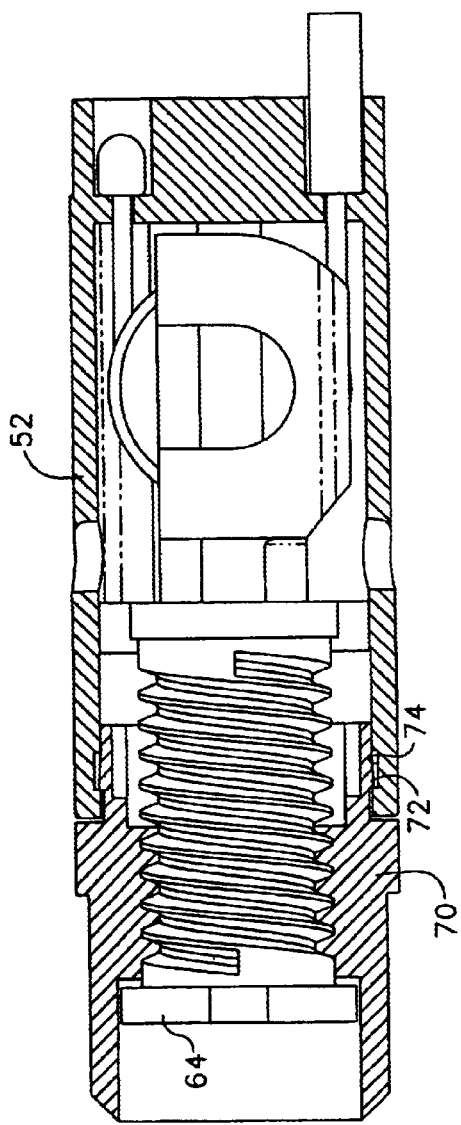
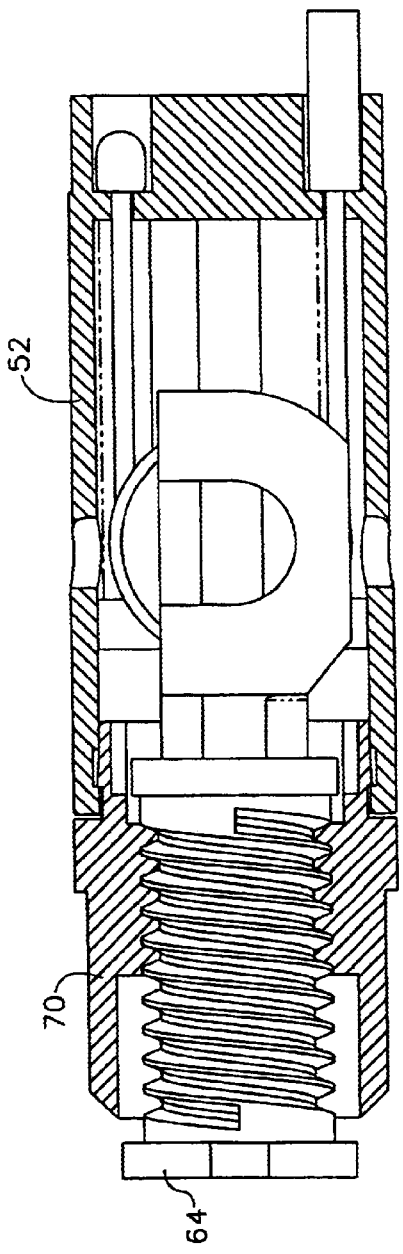
FIG. 1
FIG. 2

APPARATUS AND METHOD FOR PULLEY ACTUATOR

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates generally to tension cable actuators for ergonomic devices such as lumbar supports.

2. Related Art

Ergonomic supports for seats, especially lumbar supports for automobile seats, are frequently moved into supporting positions from flat positions by means of tension cables, such as Bowden cables. Bowden cables are simple, coaxial mechanical devices wherein a wire slides axially through a sleeve or conduit. Manufactures of moveable devices that support the weight of a seat passenger, especially devices designed to operate in dynamic tension, find that Bowden cables are an efficient way to apply traction to the moving parts of the ergonomic device. A Bowden cable sleeve end is anchored to one part of the ergonomic device, and the Bowden cable wire end to another part of the moving device. The two elements can be anchored to different portions of a single moving part, as in the case of an arching pressure surface that slides along guide rails. Alternatively, either the sleeve end or the wire end can be anchored to a non-moving portion, such as the housing of a push paddle type support, while the other element is anchored to the moving part of the device, such as the extending push paddle itself. When anchored, drawing the Bowden cable wire through the Bowden cable sleeve causes the moving parts of an ergonomic support device to travel from a relaxed, non-supporting or flat position to a tensioned, supporting position such as a bowed arch or an extended paddle.

Traction is applied to draw the wire of a Bowden cable through the sleeve of a Bowden cable by a variety of means which act on the end of the Bowden cable opposite the ergonomic device. For more expensive models of lumbar support, an electric motor is used. For devices to be installed in more economical seats, mechanical actuators are used. Typical prior art mechanical actuators anchored the Bowden cable sleeve to a stationary housing and anchored the Bowden cable wire to a moving nut threading into the housing. Turning the nut so that the threads extended it out of the housing had the effect of drawing the Bowden cable wire axially out of the Bowden cable sleeve at the actuator end. This action was translated to the ergonomic device end of the Bowden cable in order to put tension on the moving parts of the ergonomic device and bring it into a tensioned, supporting position. A typical lumbar support for a typical automobile seat travels from flat to an arched or extended position that is displaced as much as 50 mm from the flat position. Prior art manual screw type actuators required a passenger to make anywhere from four to seven complete turns of the screw nut in order to take the lumbar support through its entire range of travel.

Highly competitive markets for automobile seats and furniture place a premium on optimization of comfort and convenience for a seat occupant. There is need in the industry for a manual actuator that extends an ergonomic support device through its range of travel with fewer turns of the actuator nut by the passenger. There is also a continuing need in the industry for reducing the complication of assemblies, reducing packaging size, reducing cost, and increasing durability.

SUMMARY OF THE INVENTION

The present invention is a manual, screw type tension cable actuator that moves the connected ergonomic device through its full range of travel using half as many turns as required by prior art actuators. By requiring fewer turns, the device is more convenient for the seat passenger.

The task of the actuator is achieved by sliding the end of the Bowden cable wire axially out of the end of the Bowden cable sleeve. Accordingly, any device that moves the wire end and the sleeve end apart from one another applies the tension necessary to actuate the ergonomic device at other end of the Bowden cable. Prior art mechanical screw type actuators held the Bowden cable sleeve end stationary while drawing the Bowden cable wire end axially out of the sleeve. The present invention draws the Bowden cable wire across a pulley that is attached to a lead screw. The pulley causes twice the length of wire to be drawn out of the Bowden cable sleeve as the length that the screw is translated when the nut is turned.

In the present invention a housing holds a rotating nut, and allows it to be mounted on a seat frame. Threads inside the nut engage corresponding threads on the outside of a lead screw. At the inner end of the lead screw, preferably within the housing, is a cradle for a pulley. The cradle and the pulley it holds move axially through the housing as the screw is turned by the nut. A Bowden cable is achored to the housing at the pulley end. The Bowden cable sleeve is anchored in a seat at the end of the housing. The wire extending out of the Bowden cable is threaded through the housing, around the pulley, and back in the direction of the sleeve seat, where a second seat in the housing anchors the end of the Bowden cable wire. A passenger turns the nut which translates the lead screw outward from the housing, moving the pulley outward with it. The pulley pulls the Bowden cable wire out from the Bowden cable sleeve. The wire must be pulled out of the sleeve twice as far as the lead screw travels. Thus, a single turn of the nut achieves twice the separation travel between the wire end and the sleeve end as was achieved by the prior art, simple screw manual actuator. Accordingly, the ergonomic device may be run through its range of travel with half as many turns of the nut by a passenger.

Further features and advantages of the present invention, as well as the structure and operation of various embodiments of the present invention, are described in detail below, with reference to the accompanying drawings.

BRIEF DESCRIPTION OF THE DRAWINGS

FIG. 1 is a cut away side view of the actuator in a closed, untensioned position.

FIG. 2 is a cut away side view of the actuator in an expanded, tensioned position.

DETAILED DESCRIPTION OF THE PREFERRED EMBODIMENTS

Referring to the accompanying figures wherein like reference numbers indicate like elements, FIG. 1 is a cut away side view of the actuator of the present invention.

Figure 3:
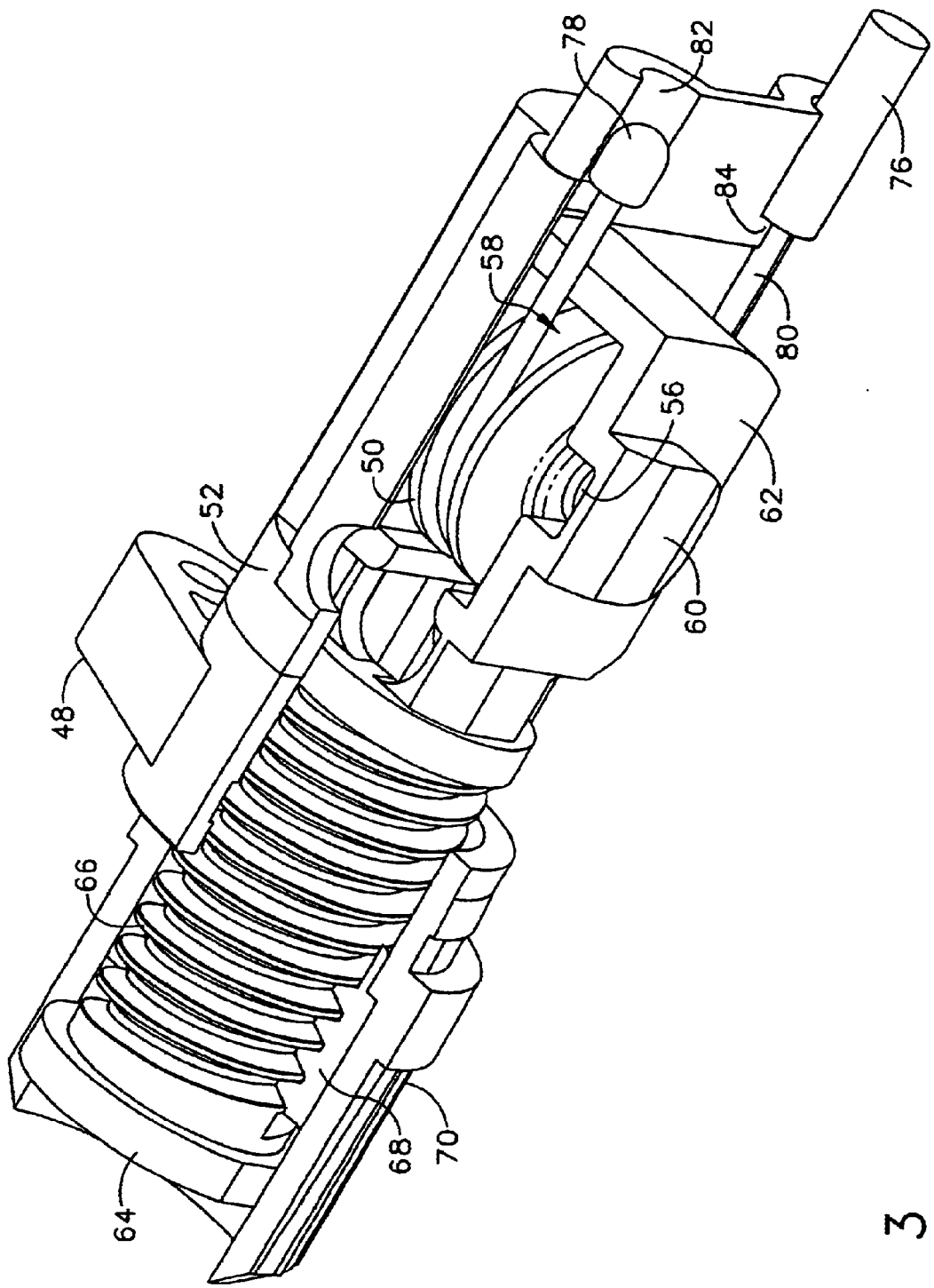
FIG. 3 is a cut away perspective view of the actuator in a closed, untensioned position.
Figure 4:
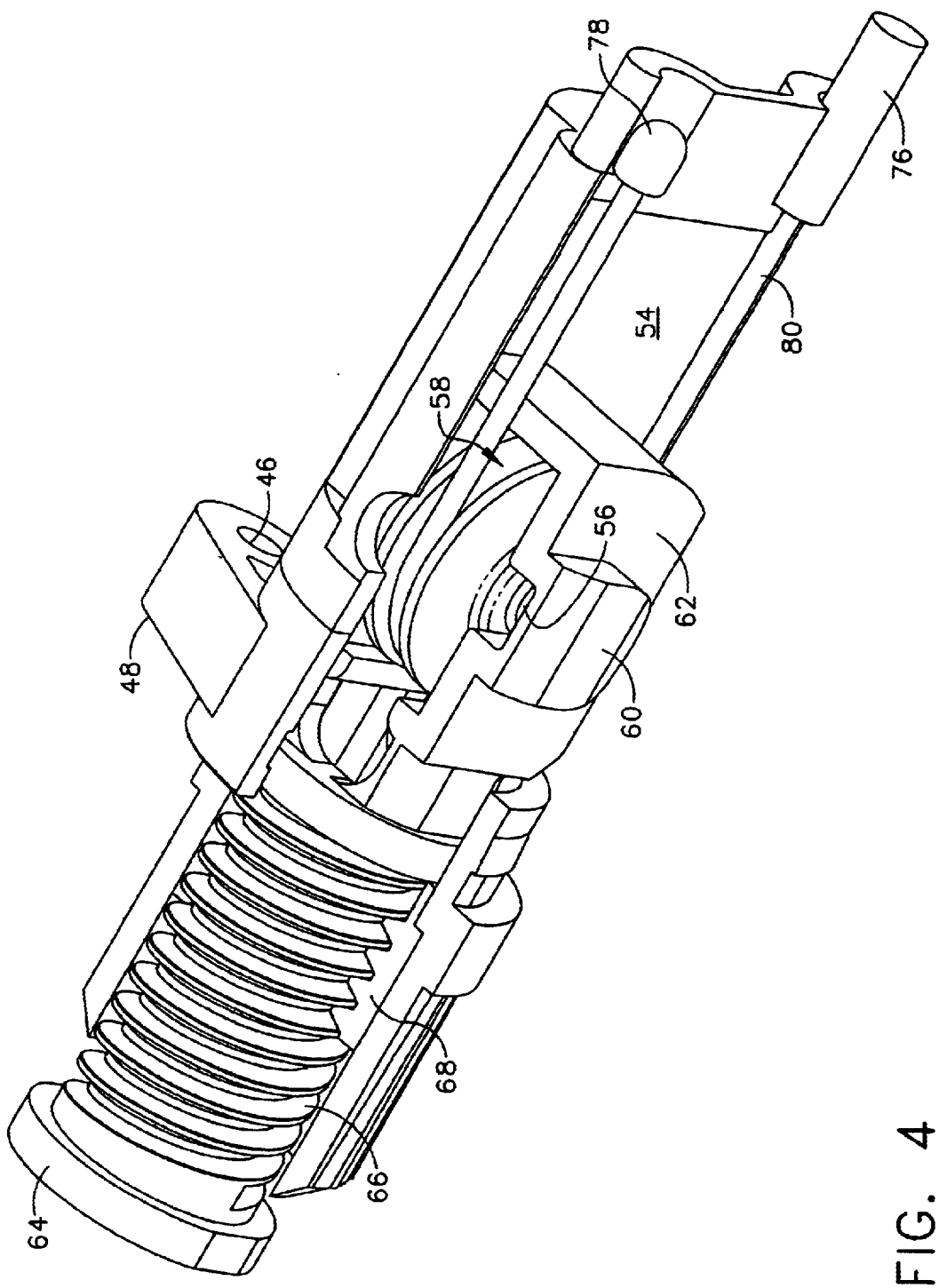
FIG. 4 is a cut away perspective view of the actuator in an expanded, tensioned position.
Figure 5:
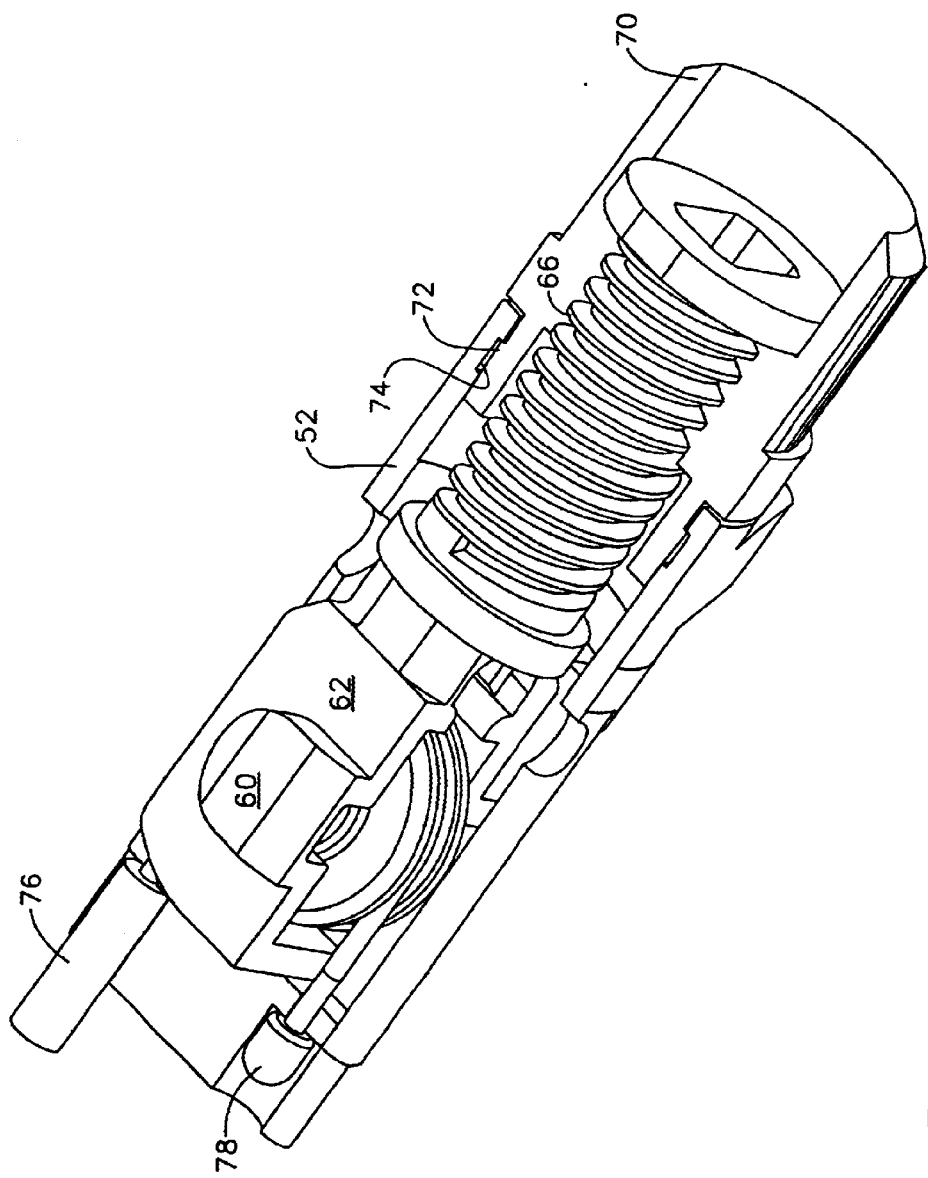
FIG. 5 is second cut away perspective view of the telescoping actuator in a closed, untensioned position.
Figure 6:
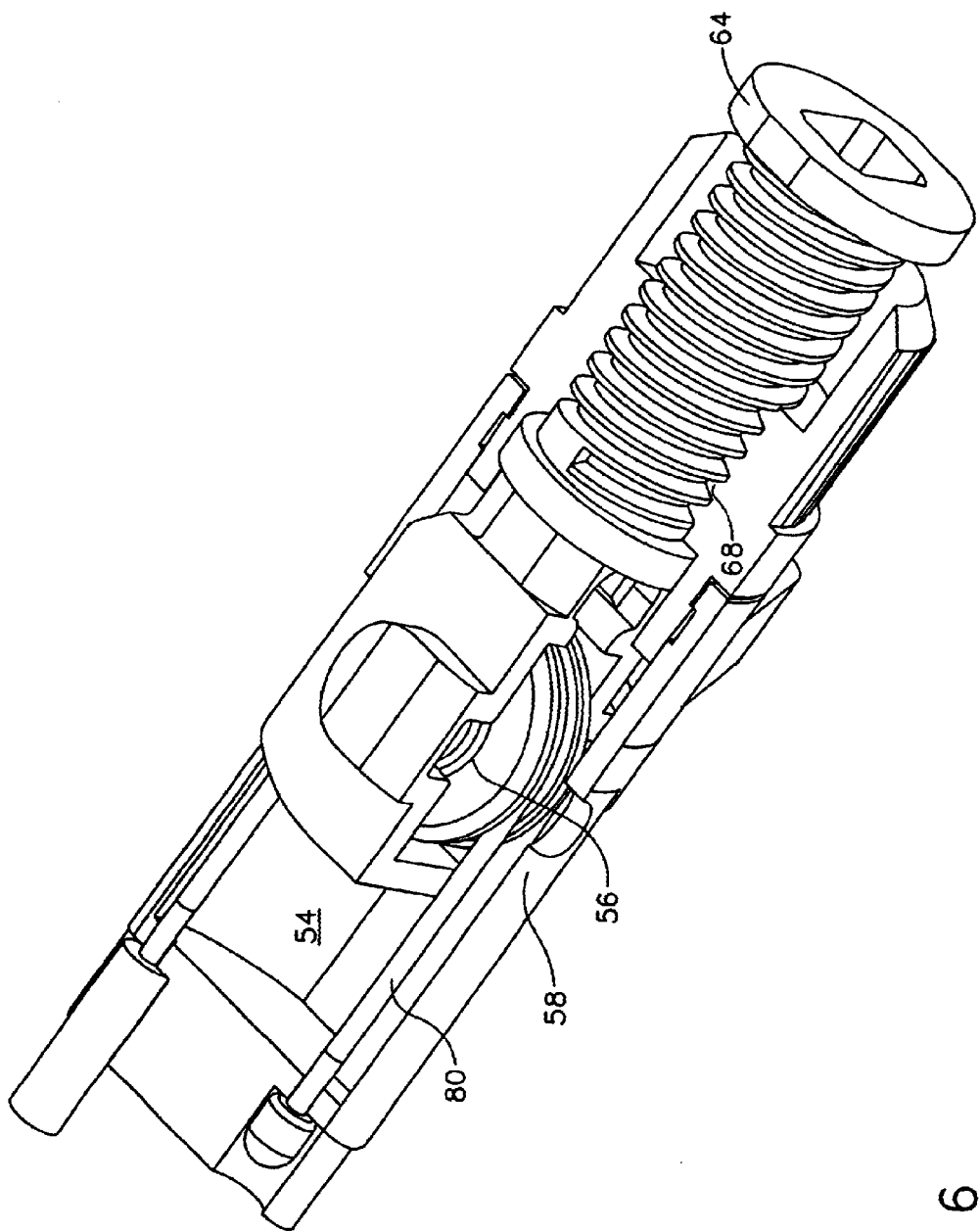
FIG. 6 is a second cut away perspective view of the telescoping actuator in an expanded, tensioned position.

FIGS. 1 through 6 are all cut-away views of the pulley actuator. FIGS. 1 and 2 are side views. FIGS. 3 and 4 are perspective views and FIGS. 5 and 6 are perspective views from a different angle. The operational components of each figure are the same.

FIGS. 2, 4, 6, 9 and 11 show the pulley actuator and its extended, tensioned position. FIGS. 1, 3, 5, 10 and 12 show the pulley actuator in its compressed, untensioned position.

FIGS. 3 and 4 show one of two brackets, 48, with screw holes, 46, for mounting the actuator to a seat frame.

FIGS. 9 through 12 show the pulley actuator with a handle on the nut.

In the depicted embodiment, pulley 50 is encapsulated within pulley housing 52. Housing 52 has a space 54 for a pulley travel. Pulley 50 has an axle 56 and a channel 58. Pulley axle 56 rides in pulley axle seat 60. Pulley axle seat 60 is a part of a pulley cradle or bracket 62. Pulley cradle 62 is fabricated as a single piece with screw 64.

Screw 64 has threads 66 which engage complimentary threads 68 inside nut 70. Nut 70 is inserted into housing 52 and held there by the interlocking of collar 72 with annular detent 74.

Tensioning wires such as Bowden cables are coaxial cables having a wire disposed to slide axially through a sleeve or conduit. One end of the Bowden cable is attached to a device to be moved with the Bowden cable sleeve end anchored to one portion of the device and the Bowden cable wire end anchored to another portion of the device. Traction on the Bowden cable wire draws the portion of the device anchored to the wire towards the portion of the device anchored to the sleeve, thereby achieving the desired motion of the device. This traction is applied by an actuator.

At the actuator end of the Bowden cable there a sleeve end, 76, and a wire end having a bullet, 78, for anchoring it. In the present actuator, the wire itself, 80, is wrapped around the pulley 50 and seated in pulley channel 58. Wire end bullet 78 is seated in wire end seat 82. Cable sleeve end 76 is seated in cable sleeve seat 84. Seats 82 and 84 hold the wire and sleeve ends, respectively, in place while traction is applied to wire 80.

FIGS. 9 through 12 show the pulley actuator with a handle 90 on the nut 70.

In operation, a seat occupant manually turns nut 70. Nut 70 rotates without translating, because it is held in place by collar 72 seated in housing 52. Threads, 68, on the inside diameter of nut 70 engage threads 66 on screw 64 and, when turned, cause screw 64 to translate axially out of housing 52. Pulley cradle 62 translates outward with screw 64, carrying with it pulley 50. Pulley 50 exerts an outward force on wire 80. Since the end of the wire is anchored at 78, wire 80 is pulled axially out of sleeve 76. In this manner, the desired traction is applied to the Bowden cable, actuating the movement of the ergonomic device at the other end of the Bowden cable.

It is apparent that for a single unit of distance traveled axially by the screw 64, the wire 80 must extend at least twice that distance. The wire, 80, must extend from the sleeve to the pulley an amount equal to the screw (and pulley) travel, and the wire, 80, must also extend that distance again for expansion from the pulley to the wire end bullet, 78. In this manner, the pulley/screw combination achieves the purpose of the present actuator by producing an effective drawn length of wire 80 that is greater than the translated distance of screw 64. Accordingly, a user has to turn nut 70 fewer times to achieve the same amount of wire travel as would be necessary with an actuator that did not combine the novel pulley/screw combination of the present invention. More specifically, assuming this same ratio of screw threads to screw length, the same degree of rotation on the nut of the present invention will draw the wire 80 out at least twice as far as that degree of rotation would draw the wire out in a prior art pulley-less actuator.

In the prior art tension was also exerted to draw a Bowden cable wire axially through a Bowden cable sleeve in order to actuate the ergonomic device. However, the prior art anchored the end of wire 80 directly to screw 64. The actuator of the present invention achieves twice as much separation between the sleeve end and the wire end as would have been achieved by prior art actuators. Accordingly, the same degree of tension can be put on the ergonomic device at the other end of the Bowden cable with half the number of rotations by the seat occupant of the nut, 70. This increased convenience to the user has value in the market place.

Typical thread pitches for manual actuators already in production may be in the range of about 2.5 millimeters of linear travel per rotation. It is known to double this pitch by using double lead in threading, which yields a pitch of substantially about 5 millimeters of linear travel per revolution of the nut. Double threading is simply die cutting screw and nut with two helically intersperced threads. Whereas a single thread manual actuator may yield 7.5 millimeters of lumbar support travel in, for example, three rotations, a double threaded variety would yield 15 millimeters of travel in three rotations. The present invention at least doubles this ratio, allowing 30 millimeters of lumbar support travel with three turns of the double threaded manual actuator nut in the telescoping actuator disclosed herein, or 10 millimeters per rotation. Thirty millimeters represents the complete range of travel for many lumbar supports, although some have ranges up to 60 millimeters.

Figure 7:
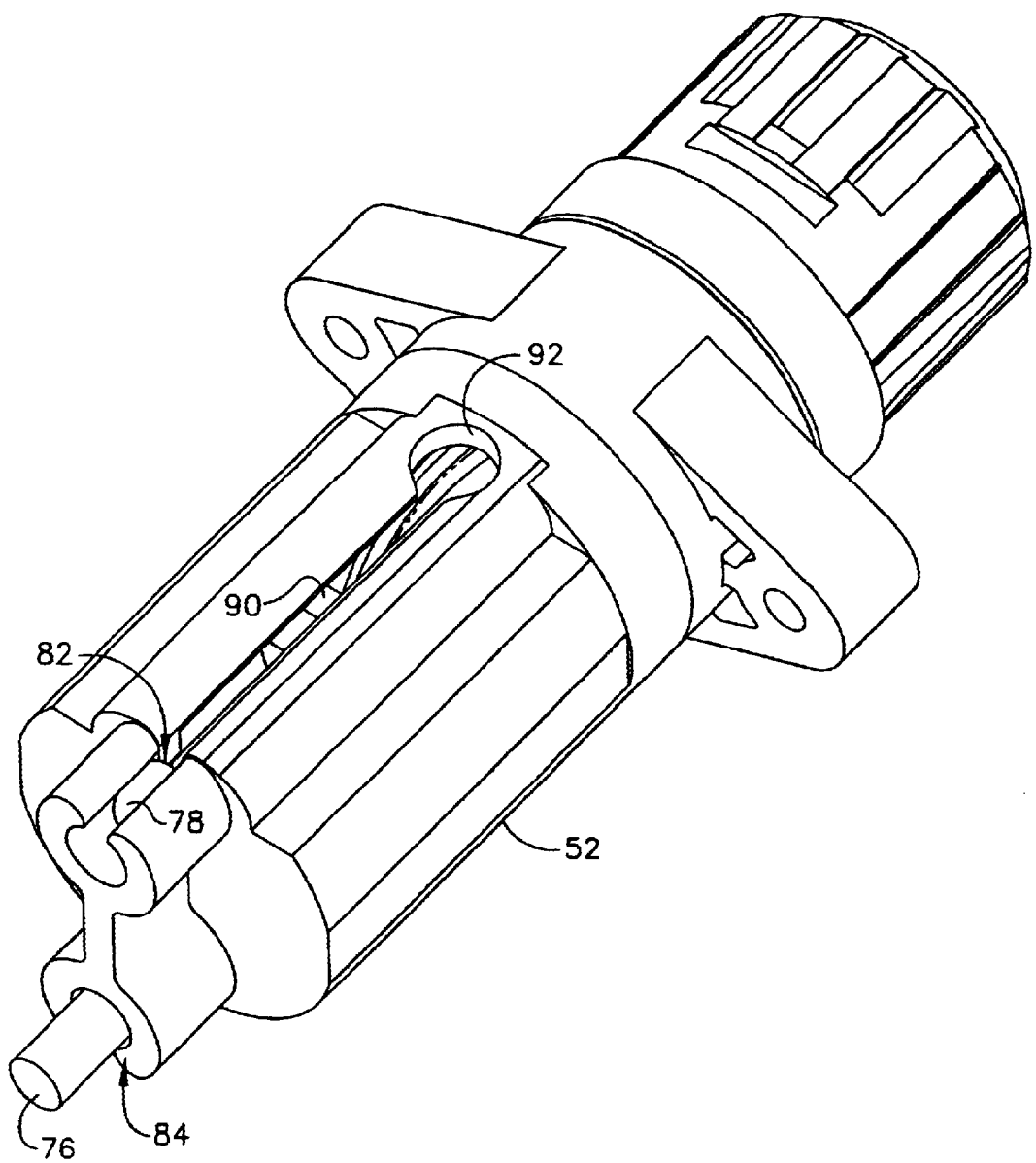
FIG. 7 is a perspective view of a first side of the assembled actuator.
Figure 8:
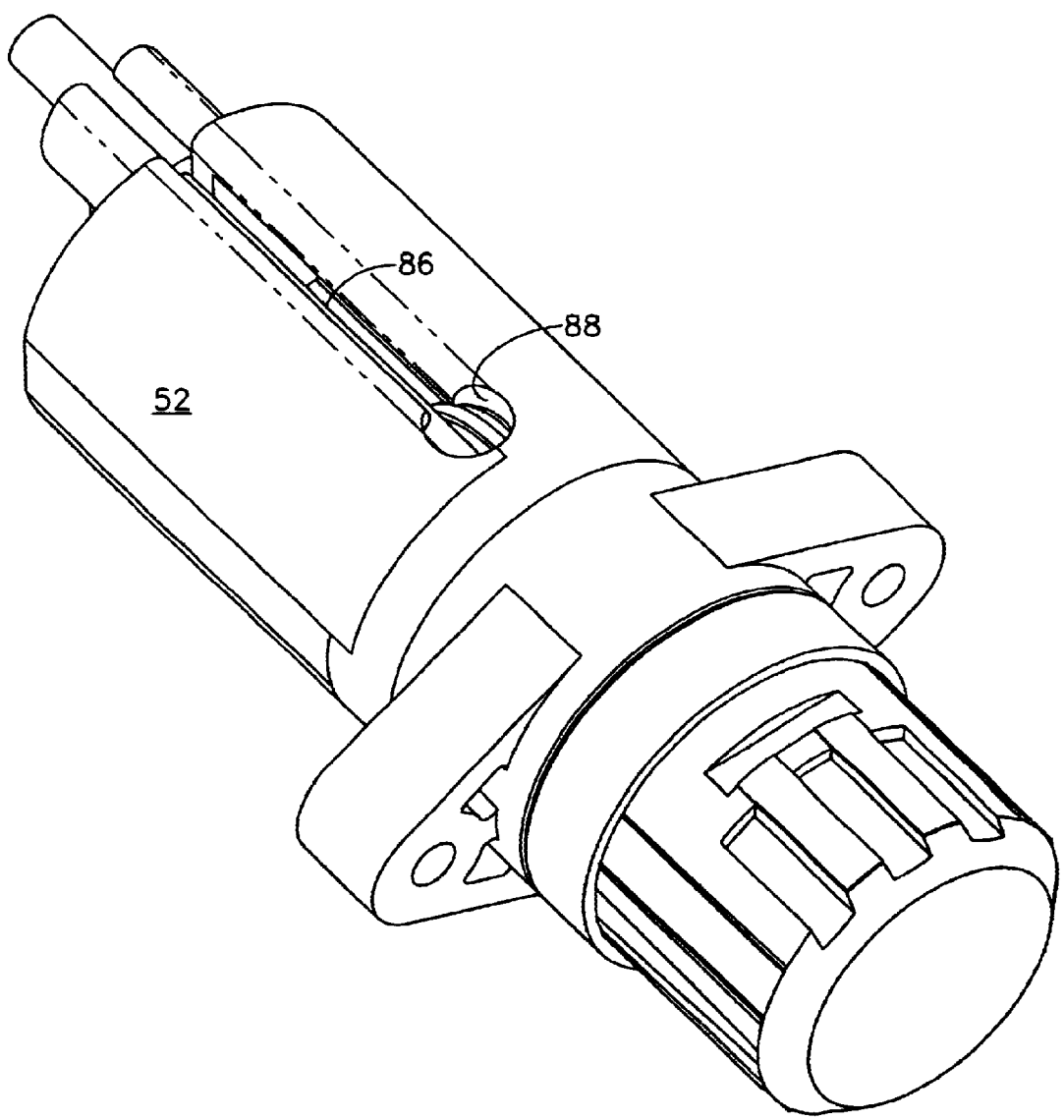
FIG. 8 is a perspective view of a second side of the assembled actuator.
Figure 9:
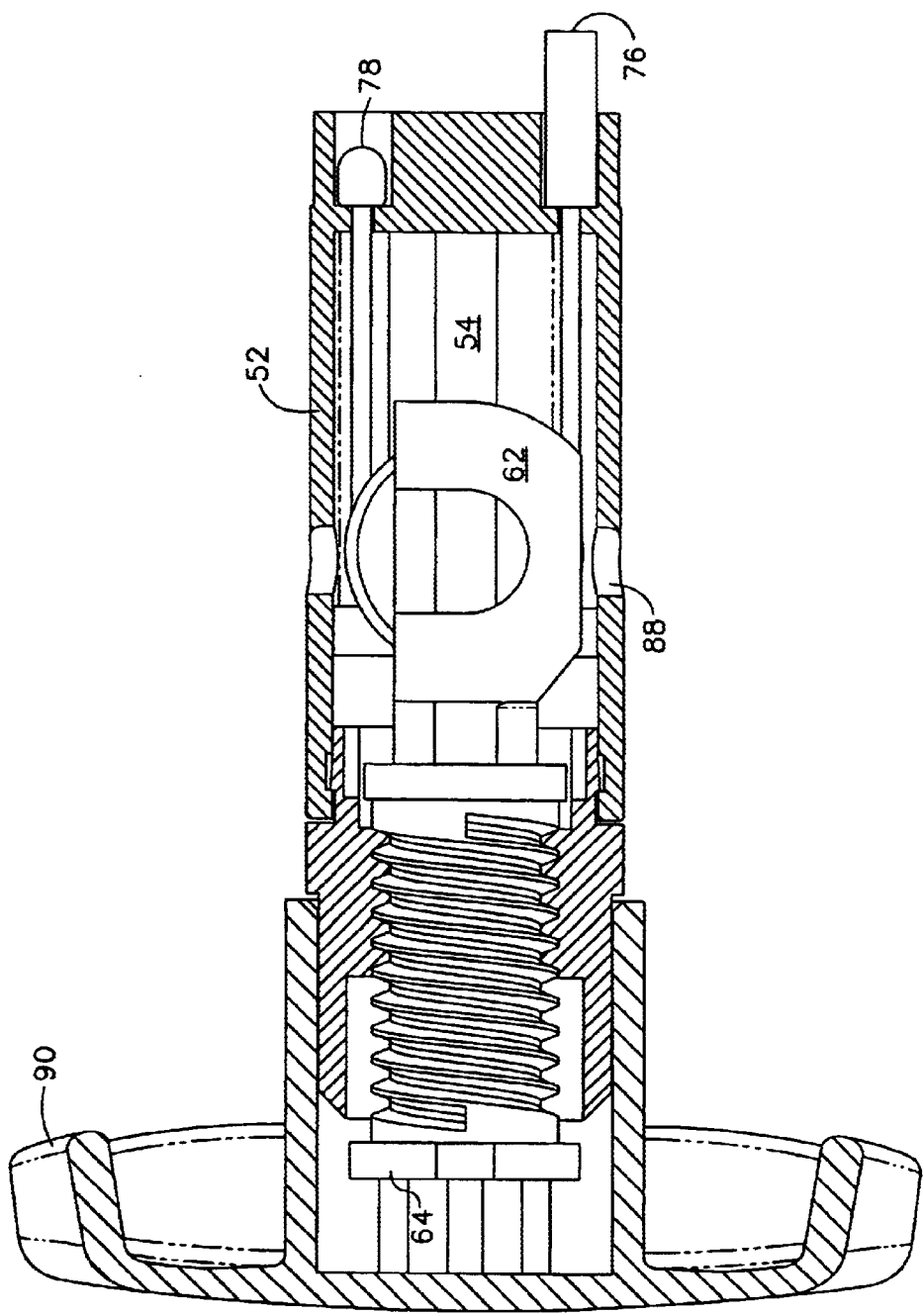
FIG. 9 is another cut away side view of the actuator in an expanded, tensioned position.
Figure 10:
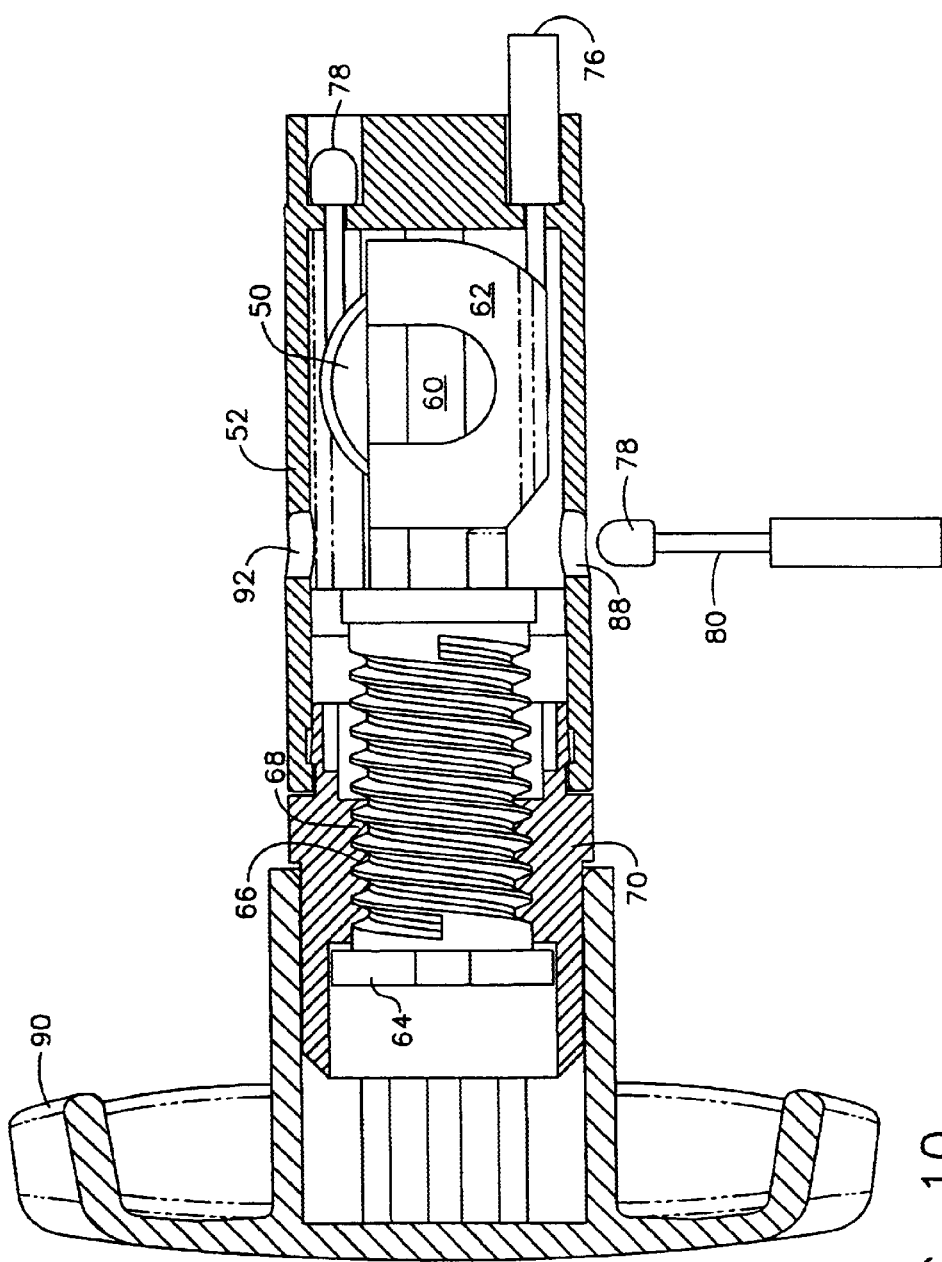
FIG. 10 is another cut away perspective view of the actuator in a closed, untensioned position.
Figure 11:
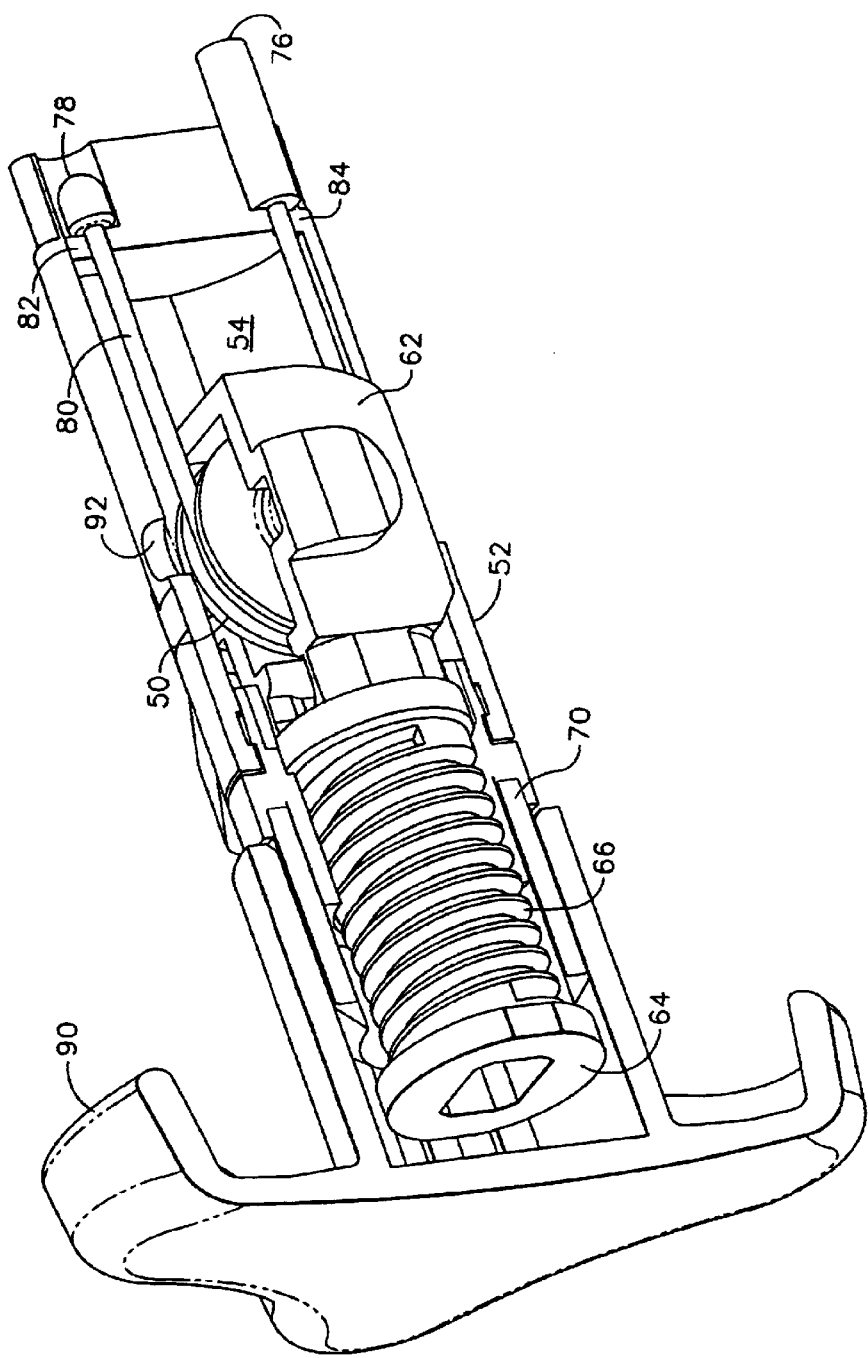
FIG. 11 is another cut away perspective view of the actuator in an expanded, tensioned position.
Figure 12:
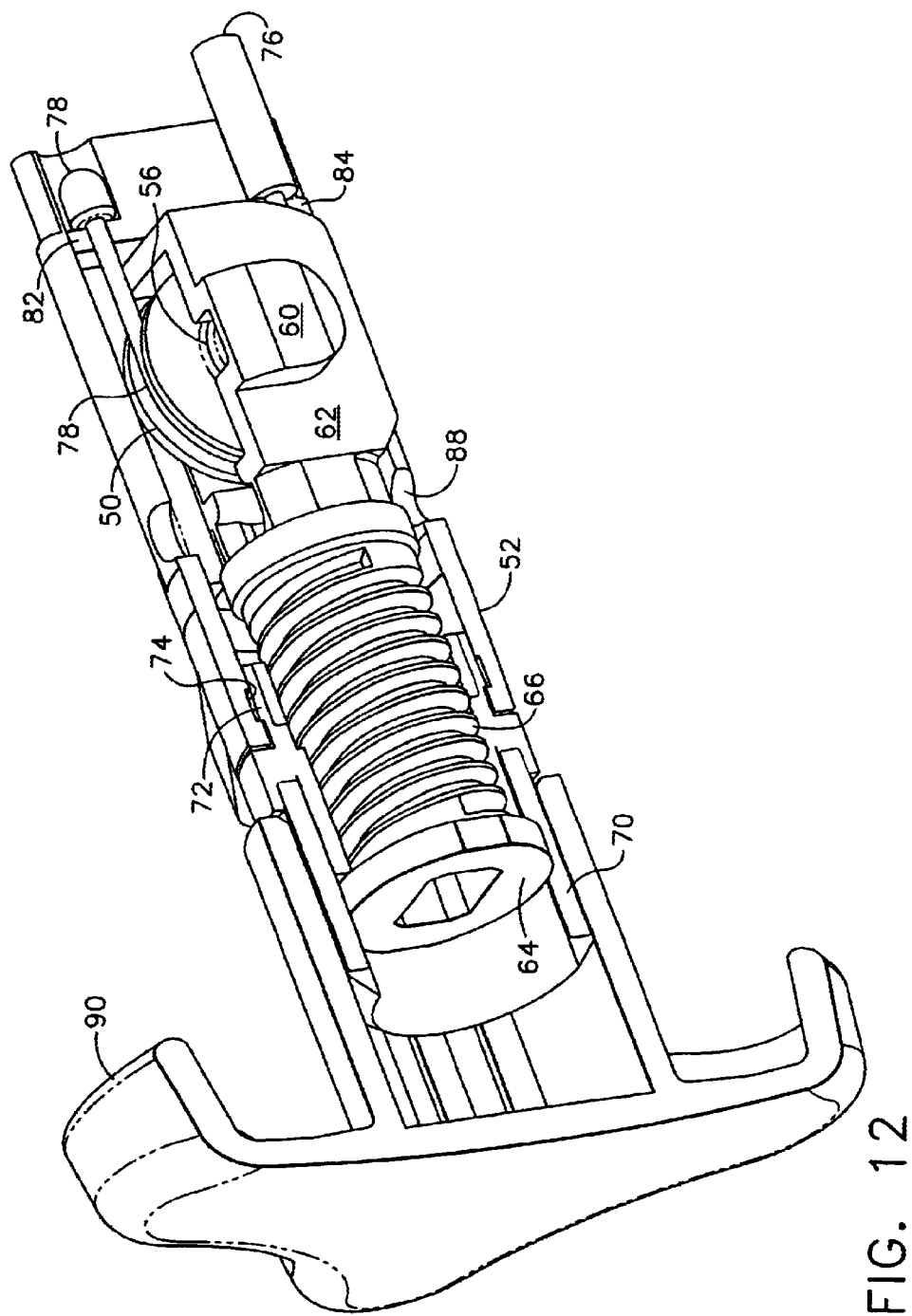
FIG. 12 is another cut away perspective view of the telescoping actuator in a closed, untensioned position.

FIGS. 7 and 8 are perspective views of the assembled pulley actuator of the present invention. These figures clearly depict the keyhole slots, 86, and 90, incorporated to ease assembly of the pulley actuator. Wire end bullet 78 is inserted through the wide portion 88 of slot 86, first on the sleeve seat side depicted in FIG. 8. Then through wide portion, 92 of slot, 90, to the wire seat 82 side of the housing, 52. The wire 80 seats in pulley channel 58. An assembler pulls wire 80 far enough so that wire and bullet 78 can be placed in wire end seat 82 and then drawn tight into its seated position. Sleeve end, 76, is seated in sleeve seat, 84. The wire is drawn tight through slots 86 and 90. FIG. 10 shows the Bowden cable wire end and end bullet, 78, oriented to be inserted in keyhole widening, 88, of slot, 86.

It is considered to be within the scope of the present invention that two or more Bowden cables may be actuated simultaneously with a single actuator. This is achieved by mounting two pulleys on the lead screw, and threading two or more Bowden cable wires through them. Alternatively, it may be achieved by doubling the width of the channel, 58, in pulley, 50, and seating two wires in it.

It is considered to be within the scope of the present invention that greater nut turn to wire travel ratios may be achieved by varying the diameter of the pulley. Greater nut turn to wire travel ratios may also be achieved by threading a single Bowden cable wire around two or more pulleys, with all of the pulleys attached to the lead screw.

The components of the present invention are preferably plastic, most preferably polyurethane, although components of metal or other materials are considered to be within the scope of the present invention. Various components will be comprised of various formulations of polyurethane as for example seeking a higher glass fill content in the housing 52 in order to stiffen it for rigidity and acceptance of self seating mounting screws. The nut 70 and lead screw 64 more preferably have a slicker formulation of polyurethane, for example nylon 66, to achieve the desired coefficient of friction. Ease of use and maintenance of position are achieved in the depicted embodiments with the coefficient of friction between the nut threads 68 and the lead screw threads 66 in a range from about 0.08 to about 0.14.

The depicted embodiments are shown with screw thread dimensions empirically found to work well with lumbar supports currently marketed, in view of the tensions created by those lumbar supports on Bowden cables and the wire that slides through them. The depicted embodiments have a screw thread pitch of 2.48 millimeters, a lead of 4.96 millimeters, a basic thread thickness at the pitch of 1.23 millimeters, a basic flat at the crest of 0.57 millimeters, a root flat thickness of 0.57 millimeters, a major diameter of 15.9/15.6 millimeters, a pitch diameter of 14.45/14.15 millimeters and minor diameter of 12.84/12.54 millimeters and a basic thread height of 1.53 millimeters. For these screw dimensions, it is found to be beneficial and efficient to mix the polyurethane used for the lead screw and nut to yield a coefficient of friction in the range from about 0.08 to about 0.14. It is contemplated to within the scope of this invention that other pitch dimensions and other coefficients of friction may optimize the mechanical efficiency of the disclosed novel design should the actuator be applied for use with tensioning cables other than the currently used Bowden cable, lumbar supports other than the currently used lumbar supports, or different dimensions of the mechanical aspects of the novel designs disclosed herein.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed is:

1. A tensioning cable actuator comprising:
    a housing having an axis;
    a nut, said nut being rotationally engaged with said housing such that said nut does not translate axially when rotated, said nut having internal threads;
    a lead screw having external threads, said external threads being engaged with said internal threads of said nut such that said lead screw translates axially when said nut is rotated;
    a pulley cradle fixed to said lead screw;
    a pulley disposed within said pulley cradle; and
    a wire seat in said housing, said wire seat being disposed to receive a wire from the tensioning cable in a position such that the wire from the tensioning cable is operatively engaged with said pulley.

2. The tensioning cable actuator of claim 1, wherein said pulley cradle and said lead screw are integrally formed.

3. The tensioning cable actuator of claim 1, wherein said rotational engagement of said nut with said housing is by a collar and an annular groove.

4. The tensioning cable actuator of claim 1, further comprising a sleeve seat in said housing for a sleeve of the tensioning cable.

5. The tensioning cable actuator of claim 1, wherein the tensioning cable is a Bowden cable.

6. The tensioning cable actuator of claim 1, further comprising an installation slot adapted to receive a tensioning cable wire.

7. The tensioning cable actuator of claim 1, further comprising an installation slot adapted to receive a tensioning cable wire with a wire end bullet.

8. The tensioning cable actuator of claim 1, wherein a coefficient of friction between said threads is preselected to hold a selected position of an ergonomic device operatively engaged with the tensioning cable.

9. The tensioning cable actuator of claim 1, wherein a coefficient of friction between said threads is within a range from about 0.08 to about 0.14.

10. The tensioning cable actuator of claim 1, wherein one rotation of said nut produces a range of about 10 millimeters to about 20 millimeters of travel of the tensioning cable wire relative to a tensioning cable sleeve.

11. The tensioning cable actuator of claim 1, wherein a pitch of said threads is within a range from about 2.0 to about 3.0 millimeters of linear travel per rotation.

12. The tensioning cable actuator of claim 1, wherein a pitch of said threads is within a range of about 4.0 to 6.0 millimeters of linear travel per rotation.

13. The tensioning cable actuator of claim 1, wherein said threads of said nut and said threads of said lead screw are double threaded.

14. The tensioning cable actuator of claim 1, wherein said nut is made of polyurethane.

15. The tensioning cable actuator of claim 1, wherein said lead screw is made of polyurethane.

16. The tensioning cable actuator of claim 1, further comprising a handle attached to said nut.

* * * * *